US006955738B2

(12) United States Patent
Derand et al.

(10) Patent No.: US 6,955,738 B2
(45) Date of Patent: Oct. 18, 2005

(54) MICROFLUIDIC DEVICES WITH NEW INNER SURFACES (75) Inventors: Helene Derand, Taby (SE); Frida Jernstrom, Uppsala (SE)

(73) Assignee: Gyros AB, Uppsala (SE)

( * ) Notice: Subject to any disclaimer, the term of this patent is extended or adjusted under 35 U.S.C. 154(b) by 0 days.

(21) Appl. No.: 10/409,820

(22) Filed: Apr. 9, 2003

(65) Prior Publication Data
US 2003/0213551 A1 Nov. 20, 2003

Related U.S. Application Data (60) Provisional application No. 60/371,080, filed on Apr. 9, 2002.

(51) Int. Cl.[7] .............................................. H05H 1/24
(52) U.S. Cl. ................... 156/272.6; 156/292; 427/535; 427/569
(58) Field of Search .......................... 156/272.2, 272.6, 156/292; 427/532, 533, 535, 536, 569

(56) References Cited

U.S. PATENT DOCUMENTS

| | | | |
|---|---|---|---|
| 5,002,794 A | 3/1991 | Ratner et al. | |
| 5,153,072 A | 10/1992 | Ratner et al. | |
| 5,171,267 A | 12/1992 | Ratner et al. | |
| 5,200,152 A | 4/1993 | Brown | |
| 5,376,252 A | 12/1994 | Ekstrom | |
| 5,690,841 A | 11/1997 | Elderstig | |
| 5,773,488 A | 6/1998 | Allmer | |
| 5,876,753 A | 3/1999 | Timmons et al. | |
| 5,962,081 A | 10/1999 | Ohman | |
| 5,995,209 A | 11/1999 | Ohman | |
| 5,997,961 A * | 12/1999 | Feng et al. ................. 427/515 |
| 6,126,765 A | 10/2000 | Ohman | |
| 6,144,447 A | 11/2000 | Ohman et al. | |
| 6,192,768 B1 | 2/2001 | Wallman | |
| 6,203,291 B1 | 3/2001 | Stemme | |
| 6,306,975 B1 | 10/2001 | Zhao et al. | |
| 6,319,469 B1 | 11/2001 | Mian et al. | |
| 6,322,682 B1 | 11/2001 | Arvidsson | |
| 6,329,024 B1 | 12/2001 | Timmons et al. | |
| 6,454,970 B1 | 9/2002 | Ohman | |
| 6,620,478 B1 | 9/2003 | Ohman | |
| 6,632,656 B1 | 10/2003 | Thomas et al. | |
| 6,653,625 B2 | 11/2003 | Andersson | |
| 6,717,136 B2 | 4/2004 | Andersson | |
| 6,728,644 B2 | 4/2004 | Bielik | |
| 6,811,736 B1 | 11/2004 | Ohman | |
| 6,812,456 B2 | 11/2004 | Andersson | |
| 6,812,457 B2 | 11/2004 | Andersson | |
| 2003/0044322 A1 | 3/2003 | Andersson | |
| 2003/0047823 A1 | 3/2003 | Ohman | |
| 2003/0053934 A1 | 3/2003 | Andersson | |
| 2003/0054563 A1 | 3/2003 | Ljungstrom | |
| 2003/0082075 A1 | 5/2003 | Agren | |
| 2003/0094502 A1 | 5/2003 | Andersson | |
| 2003/0129360 A1 | 7/2003 | Derand | |
| 2003/0156763 A1 | 8/2003 | Soderman | |
| 2003/0211012 A1 | 11/2003 | Bergstrom | |
| 2003/0231312 A1 | 12/2003 | Sjoberg | |
| 2004/0028875 A1 * | 2/2004 | Van Rijn et al. ............. 428/98 |
| 2004/0058408 A1 | 3/2004 | Thomas | |
| 2004/0096867 A1 | 5/2004 | Andersson | |
| 2004/0099310 A1 | 5/2004 | Andersson | |
| 2004/0120856 A1 | 6/2004 | Andersson | |
| 2004/0202579 A1 | 10/2004 | Larsson et al. | |

FOREIGN PATENT DOCUMENTS

| | | |
|---|---|---|
| DE | 19853815 | 5/2000 |
| EP | 0896035 | 2/1999 |
| WO | WO-9721090 | 6/1997 |
| WO | WO-9958245 | 11/1999 |
| WO | WO0040750 | 7/2000 |
| WO | WO 00/56808 * | 9/2000 |
| WO | WO-0147637 | 7/2001 |

OTHER PUBLICATIONS

Internationa Preliminary Report on Patentability for Application No. PCT/SE 2003/000560.
International Search Report for Application No. PCT/SE 03/00560.
U.S. Appl. No. 09/937,533, Larsson et al.
U.S. Appl. No. 10/111,822, Tooke et al.
U.S. Appl. No. 10/169,056, Andersson et al.
U.S. Appl. No. 10/276,282, Larsson et al.
U.S. Appl. No. 10/849,321, Fielden et al.
U.S. Appl. No. 10/244,667, Agren.
U.S. Appl. No. 10/402,138, Kylberg et al.
U.S. Appl. No. 10/069,827, Derand et al.
U.S. Appl. No. 09/958,577, Ulfendahl.
U.S. Appl. No. 09/674,457, Larsson et al.
U.S. Appl. No. 09/869,554, Orlefors et al.
U.S. Appl. No. 09/830,475, Stjernstrom.
U.S. Appl. No. 10/129,032, Tormod.
U.S. Appl. No. 10/168,942, Tooke et al.
U.S. Appl. No. 10/450,177, Ohman et al.
U.S. Appl. No. 10/957,452, Ekstrand et al.
U.S. Appl. No. 10/070,912, Ohman et al.

(Continued)

Primary Examiner—John T. Haran
(74) Attorney, Agent, or Firm—Fulbright & Jaworski LLP (57) ABSTRACT A microfluidic disc having one or more enclosed microchannel structures, and the microchannel structures are intended to be used for transport of transporting liquids. The device is characterized in that at least a part of the inner walls of each of one or more microchannel structures are treated with a gas plasma having one or more organic precursor compounds.

9 Claims, 3 Drawing Sheets

OTHER PUBLICATIONS

U.S. Appl. No. 10/402,137, Kylberg et al.
U.S. Appl. No. 10/182,792, Derand et al.
U.S. Appl. No. 10/030,297, Derand et al.
U.S. Appl. No. 09/937,533, Hellermark et al.
U.S. Appl. No. 10/924,151, Tooke et al.
U.S. Appl. No. 10/867,893, Andersson et al.
U.S. Appl. No. 10/513,084, Holmquist et al.
U.S. Appl. No. 10/999,532, Ostlin et al.
U.S. Appl. No. 11/017,252, Derand et al.

* cited by examiner

MICROFLUIDIC DEVICES WITH NEW INNER SURFACES

This Application claims priority to U.S. Provisional Application No. 60/371,080 filed on Apr. 9, 2002, which is incorporated herein by reference in its entirety.

BACKGROUND OF THE INVENTION

I. Field of Invention

The present invention concerns a microfluidic device that has inner surfaces with chemical surface characteristics that have been introduced using gas plasmas having one or more organic precursor compounds.

II. Related Art

A number of different techniques for modifying substrate surfaces are well known. One common method is to subject a substrate surface, for instance made in plastics, to various forms of plasma treatment (Chan et al., Surface Science Reports 24 (1996) 1–54; and Garbassi et al., Polymer Surfaces—From Physics to Technology, John Wiley (1998) 238–241). This is done in a plasma reactor, which is a vacuum vessel containing a gas at low pressure (typically 10 to 1000 mTorr). When a high frequency electric excitation field is applied over the reactor, a plasma (also called glow discharge) is formed, containing reactive species like ions, free radicals and vacuum-UV photons. These species may react with other species and/or with the surface and cause a chemical modification of the substrate surface with properties depending on the nature of the gas and on the plasma parameters. Gases like oxygen and argon are typically used for hydrophilization and/or adhesion improvement on plastics, while vapors of organic precursor compounds can be used to apply thin coatings for a number of different purposes (Yasuda, Plasma Polymerization, Academic Press 1985).

Previously, vapors of organic precursor compounds have been used to produce surfaces that are wettable by aqueous liquids but the hydrophilicity has been moderate and not utilized to facilitate transport of aqueous liquids, in microchannels. In some cases, the primary goal has been to introduce coats that have a low non-specific adsorption, for instance of proteins and/or other biopolymers and/or other bioorganic molecules. See for instance discussions U.S. Pat. No. 5,153,072 (Ratner et al.), U.S. Pat. No. 5,002,794 (Ratner et al.), U.S. Pat. No. 6,329,024 (Timmons et al.), U.S. Pat. No. 5,876,753 (Timmons et al.), EP 896035 (Timmons et al.). Strictly hydrophobic surfaces have also been produced. See for instance U.S. Pat. No. 5,171,267 (Ratner et al.).

WO 0056808 (Ocklind, Larsson and Dérand, Gyros AB) describes microfluidic devices comprising hydrophilic microchannel structures defined between two essentially planar substrates that are apposed. Before being apposed the surface of at least one of the substrates has been hydrophilized in gas plasma, which comprises a non-polymerizable gas. The surfaces obtained are hydrophilic and can be coated subsequent to gas plasma treatment in order to introduce further functionalities.

WO 9958245 (Larsson et al.) and WO 97 21090 (Mian et al.) are examples of publications that in general terms suggest microfluidic devices in which the inner surfaces of the microchannel structures have been made hydrophilic by gas plasma treatment, coating of hydrophobic surfaces with hydrophilic polymer, etc.

BRIEF SUMMARY OF THE INVENTION

A first object of the invention is to present a surface modification method. Accordingly, the first aspect of the invention is a method for the manufacture of a microfluidic device to introduce a predetermined degree of wettability (hydrophilicity and/or hydrophobicity) on an inner surface of said microchannel structures. The method is characterized in comprising the steps of: (i) providing two essentially planar substrates (I and II); (ii) placing either one or both of the substrates in a gas plasma reactor, and creating within said plasma reactor a gas plasma containing an organic precursor compound, said organic precursor compound and the conditions in the reactor being selected such that a coat of the predetermined degree of wettability is formed on a selected part of the surface of the substrate/substrates; (iii) removing the substrate/substrates from the plasma reactor; (iv) adhering the surface of substrate I to the surface of substrate II so that at least an enclosed section of each of microchannel structures are formed between the two surfaces; and (v) optionally joining further planar substrates to complete the microchannel structures. In the simplest variant complete enclosed microchannel structures are defined between substrate I and II.

A second object of the invention is to provide new surface modifications that have a sufficient wettability combined with a sufficiently low non-specific adsorption for a reliable and reproducible mass transport and processing of reagents by a liquid flow through a microchannel structure. This object, thus, aims at optimizing wettability and anti-fouling in relation to each other.

A third object is directed to a microchannel structure that is present in a microfluidic device and comprises two or more different functional parts, at least one of which comprises inner surfaces of a sufficient hydrophilicity for a liquid aliquot to penetrate completely the functional part by capillary force once having wetted the entrance of the part. The demand for a sufficiently low non-specific adsorption remains.

A fourth object is to accomplish a microfluidic device comprising coats that can be stored for $\geq 7$ days, such as $\geq 30$ days, while retaining the intended functionality of the surface, i.e., the surface may still be used for the intended purpose (=is essentially unchanged).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings.

DETAILED DESCRIPTION OF THE INVENTION

I. Definitions

As used herein, the use of the word "a" or "an" when used in conjunction with the term "comprisng" in the sentences and/or the specification may mean "one," but it is also consistent with the meaning of "one or more," "at least one," and "one or more than one."

As used herein, the term a "microfluidic device" typically comprises one, two or more microchannel structures, which are defined between two essentially planar and parallel substrates that are apposed to each other. Thus, either one or both of the two substrate surfaces that define the microchannel structures comprise microstructures in the form of grooves and/or projections such that the microchannel structures can be formed when the two surfaces are apposed. The device is microfluidic in the sense that one or more liquid aliquots can be transported between different functional parts of the individual microchannel structures in order to process the aliquots. The liquid aliquots are in the $\mu$l-range with preference for the nl-range. The purpose of the transport is to carry out predetermined process protocols, for instance for assaying one or more constituents of a sample aliquot or to synthesize an organic or an inorganic compound. The liquid aliquots are typically aqueous, i.e., based on water and mixtures between water and water-miscible organic solvents.

As used herein, the term "microchannel structure" relates to the structure that is defined between the surfaces of two or more planar substrates that are layered on top of each other. If different sections of a microchannel structure are defined between different pairs of planar substrates, there typically are holes in the substrates so that the sections are in communication with each other. Either one or both of the surfaces that are to define a section of a microchannel structure comprises microstructures such that the desired section of a microchannel structure will be formed when the surfaces are joined together. Separate microchannel structures may be defined between additional essentially planar substrates.

As used herein, the term "plurality" means two, three, four, five or more microchannel structures. Preferably "plurality" means that the number of microchannel structures on the microfluidic device is $\geq 10$, such as $\geq 25$ or $\geq 90$ or $\geq 180$ or $\geq 270$ or $\geq 360$.

As used herein, the terms "microchannel", "microconduit", etc., contemplate that a channel structure comprises one or more cavities and/or channels/conduits that have a cross-sectional dimension that is $\leq 10^3$ $\mu$m, preferably $\leq 0.5 \times 10^3$ $\mu$m or $\leq 10^2$ $\mu$m. The lower limit for cross sectional dimensions is typically significantly larger than the size of the largest constituent of a liquid that is to pass through a microchannel of the innovative device. The volumes of microcavities/microchambers are typically in the nl-range, i.e., $\leq 5000$ nl, such as $\leq 1000$ nl or $\leq 500$ nl or $\leq 100$ nl or $\leq 50$ nl or $\leq 25$ nl. This does not exclude larger chambers/cavities, for instance in the intervals 1–1000 $\mu$l, such as 1–100 $\mu$l or 1–10 $\mu$l which typically are directly connected to inlet ports and intended for application of sample and/or washing liquids.

As used herein, the term "microformat" means that one, two, three or more liquid aliquots that are transported within the device are within the intervals specified for the microchambers/microcavities.

As used herein, the terms "non-specific adsorption" and "fouling", which are interchangeable, mean undesired adsorption of compounds to inner walls of the microchannel structures. The terms may also include inactivation of bioactive compounds by the walls, for instance denaturation of proteins. The compounds are present in the liquid used and are primarily reagents. For aqueous liquids the reagents may be proteins and/or other biopolymers and/or other bioorganic and synthetic organic compounds.

As used herein the term "anti-fouling" refers to reduction in non-specific adsorption (undesired adsorption) of reagents compared to a reference surface that in the context of the invention is the surface before being treated in a gas plasma comprising an organic precursor.

As used herein, the term "analytes" are also included in the term "reagent".

As used herein, the term "wettable" refers to a surface having a water contact angle that is $\leq 90°$ (hydrophilic surface).

As used herein, the term "non-wettable" refers to a surface that has a water contact angle $\geq 90°$ (hydrophobic surface).

As used herein, the term "wettability" refers to the "degree of wettability" and may include a highly wettable surface, a highly non-wettable surface or any variation therebetween.

As used herein, the term "predetermined degree of wettability" refers to the wettability of a coat that is important for the function of a microchannel structure. The predetermined degree of wettability may imply a wettable surface that will allow for capillary flow, a non-wettable surface that will act as a valve, a vent, an anti-wicking means, etc. Typically, the expression means that the wettability of the coat is different from the wettability of the surface without the coat.

As used herein, the term "organic precursor" refers to an organic compound that forms reactive species in a gas plasma.

As used herein, the term "masking" refers to placing a removable protective coat/mask on surface parts that are not to be coated by the subsequently applied coating method.

II. Method of Manufacture

During the last decade sophisticated microfluidic devices have appeared with the goal to fully integrate complete process protocols in miniaturized form. This means integration of all steps of a protocol from sample preparation to recording of the results in one and the same microchannel structure. Thus, it is advantageous if the same kind of equipment is used to produce surfaces corresponding to a spectra of chemical surface characteristics, for instance from extremely hydrophobic to extremely hydrophilic surfaces, and preferably with anti-fouling properties.

The present inventors have recognized that the above-mentioned objects can be achieved by treating the channel surfaces with gas plasma, which comprises one or more organic precursor compounds in gas form. The obtained surface characteristics (for instance hydrophilicity or hydrophobicity) is determined by the selection of the organic precursor compound and/or the process parameters applied to create the gas plasma as outlined below.

Accordingly the first aspect of the invention is a method for the manufacture of a microfluidic device of the kind described above in order to introduce a predetermined degree of wettability (hydrophilicity and/or hydrophobicity) on an inner surface of said microchannel structures. The method is characterized in comprising the steps of: (i) providing two essentially planar substrates (I and II); (ii) placing either one or both of the substrates in a gas plasma reactor, and creating within said plasma reactor a gas plasma containing an organic precursor compound, said organic precursor compound and the conditions in the reactor being selected such that a coat of the predetermined degree of wettability is formed on a selected part of the surface of the substrate/substrates; (iii) removing the substrate/substrates from the plasma reactor; (iv) adhering the surface of substrate I to the surface of substrate II so that at least an enclosed section of each of microchannel structures are formed between the two surfaces; (v) optionally joining further planar substrates to complete the microchannel structures. In the simplest variant, complete enclosed microchannel structures are defined between substrate I and II.

Microchannels are typically defined by a limited number of well-defined walls, for instance a bottom wall, a top wall and two sidewalls. These walls may derive from different substrates. Locally at least the walls derived from the same substrate are wettable/non-wettable to the same extent. In the case the surface characteristics of a channel is intended to facilitate liquid transport, and the walls derived from one of the substrates is non-wettable this can be compensated if the wall(s) derived from the other substrate is(are) sufficiently wettable (i.e., has/have a sufficiently low water contact angle).

In order to facilitate good transport of a liquid between different functional parts of the inventive microfluidic devices, the liquid contact angle in the individual parts should primarily be wettable, preferably with a water contact angle $\leq 60°$ such as $\leq 50°$ or $\leq 40°$ or $\leq 30°$ or $\leq 20°$. Local surface breaks that are to be used for valving and/or anti-wicking, for instance, are important exceptions from this general rule. Local surface breaks are typically non-wettable with water contact angles $\geq 90°$, such as $\geq 100°$ or $\geq 110°$ or $\geq 120°$. Typically the difference in wettability (in water contact angles) between a local surface break and a bordering surface are $\geq 50°$, such as $\geq 60°$ or $\geq 70°$. All figures refer to values obtained at the temperature of use, typically 25° C., and with water as the liquid.

One important problem with respect to microfluidic devices is to obtain surfaces with a sufficient hydrophilicity to support liquid transport through a microchannel structure combined with a sufficiently low non-specific adsorption (anti-fouling) of reagents in order to accomplish reliable and reproducible results. The severity of the fouling problem (nonspecific adsorption) increases with the surface to volume ratio, i.e., it increases when a cross sectional dimension decreases, for instance from $\leq 1000\,\mu m$ to $\leq 100\,\mu m$ to $\leq 10\,\mu m$ and/or from $\leq 1000\,\mu l$ to $\leq 100\,\mu l$ to $\leq 10\,\mu l$ to $\leq 1\,\mu l$ to $\leq 100$ nl to $\leq 50$ nl. Even if it is often said that hydrophobic surfaces have prominent non-specific adsorption there are numerous systems for which also hydrophilic surfaces have a disturbing non-specific adsorption.

A. Additional Steps and Variations

Between steps (i) and (ii), (ii) and (iii) and/or (iii) and (iv) there may be one or more additional steps for introducing one or more surface modifications with characteristics that are different from the coat introduced in step (ii). These additional steps may involve (a) a gas plasma treatment utilizing the same or another precursor compound and/or the same or other conditions, and/or (b) some other coating procedure. Depending on the kind of surface modification, alternative (a) may be carried out without removing and re-inserting the substrate/substrates from/into the gas plasma reactor.

If only a part of a substrate surface is to be coated in step (ii) or in any of the additional steps, appropriate masking and/or unmasking may be done before or after such a coating step (including sequence of steps). Parts that are masked/unmasked may be present in either one or both of the substrate surfaces, for instance on a part comprising microstructures. Washing steps may be included between steps if appropriate.

One variant of step (ii) is to introduce a coat that is wettable (hydrophilic) and/or has a pronounced resistance to non-specific adsorption (=anti-fouling) on a major part of the microstructured part of the surface. Microstructured areas that are not going to be coated in this step are typically masked. The precursor compound and the plasma conditions for the gas plasma are selected as outlined below. After step (ii) and unmasking, the uncoated areas thus exposed may be further processed, for instance to render them non-wettable (hydrophobic) in order to create passive (non-closing) valves and/or anti-wicking means and/or inlet or outlet vents to ambient atmosphere. These kinds of functionalities are illustrated in WO 9958245 (Larsson et al., Gyros AB), WO 0185602 (Larsson et al., Gyros AB & Åmic AB), WO 0146465 (Andersson et al., Gyros AB), and WO 02074438 (Andersson et al., Gyros AB), which are incorporated herein by reference. In the case an uncoated area as such provides a sufficiently low wettability (i.e., are non-wettable), the surface at these positions may be used directly as a valve and/or as an anti-wicking means and/or as a vent after step (iv) without any extra processing. Many times, however, it is more appropriate to make these non-treated areas more non-wettable (increase the hydrophobicity), for instance by inserting steps according to alternatives (a) or (b) between steps (ii) and (iv). In the case alternative (a) is selected, the precursor and gas plasma conditions are selected to give a non-wettable surface as known in the field and also discussed below. Spraying or printing may also be utilized as alternative (b). See for instance WO 0185602 (Larsson et al., Gyros AB & Åmic AB), and WO 0146465 (Andersson et al., Gyros AB), which are incorporated by reference herein. In order to secure that the valve and/or anti-wicking means will be located to a desired position and/or have a desired geometry, appropriate masking is advantageous for an additional step.

Another variant of step (ii) is to introduce a coat that is non-wettable (hydrophobic coat) on selected parts of the microstructures. Areas on which other surface characteristics are desired are then typically masked. The non-wettable coat may be introduced for creating local surface breaks of the same type as indicated in the preceding paragraph. The remaining parts may be intended for liquid transport and therefore typically need to be processed to surfaces that are wettable by inserting steps according to either alternative (a) or alternative (b) above after step (ii). Remasking for these additional steps is often advantageous for similar reasons as for the first variant. In the case the uncoated area after unmasking inherently comprises a desired wettability (either by being wettable or non-wettable), there is no need to introduce any additional surface treatment steps before step (iv).

A third variant of step (ii) is to introduce a coat that is sufficiently wettable or sufficiently non-wettable, but not with sufficiently low non-specific adsorption (anti-fouling), or vice versa. In this case, an additional step according to alternative (a) or (b) may be used to modify the coat to exhibit the missing characteristics while at the same time retaining an essential part of the surface characteristics created in step (ii). In this case the same masking can be utilized for the two coating steps. Demasking and remasking between step (ii) and an additional step may then not be required.

B. The Substrates

Each of the two planar substrates may comprise microstructures in the form of projections and/or grooves as discussed above. In the preferred variants, however, only one of the two substrates comprises microstructures that then are in the form of open microchannel structures or open sections of the microchannel structures. The other substrate is used to cover these open structures. Either one or both of the substrates may have through-going holes that are associated with individual microchannel structures. These holes may be used as inlets or outlets for liquids and/or as inlet or outlet vents for air. In the case different sections of a microchannel structure are defined between different pairs of substrates this kind of holes may provide communication between the different sections.

The substrates may be made from inorganic or organic material. Typical inorganic materials are silicon, quartz, glass, etc. Typical organic materials are polymer materials, for instance plastics including elastomers, such as silicone rubber (for instance poly dimethyl siloxane) etc. Polymer material as well as plastics comprises polymers obtained by condensation polymerization, polymerization of unsaturated organic compounds and/or other polymerization reactions. The microstructures may be created by various techniques such as etching, laser ablation, lithography, replication by embossing, moulding, casting, etc. Each substrate material typically has its preferred techniques.

From the manufacturing point of view, substrates exposing surfaces and microstructures in plastics are many times preferred because the costs for plastics are normally low and mass production can easily be done, for instance by replication. Typical manufacturing processes involving replication are embossing, moulding, casting, etc. See for instance WO 9116966 (Pharmacia Biotech AB, Öhman & Ekström), which is incorporated herein by reference. At the priority date of this invention, the preferred plastics were polycarbonates and polyolefins based on polymerizable monomeric olefins that comprise straight, branched and/or cyclic non-aromatic structures. Typical examples are ZeonexTM and ZeonorTM from Nippon Zeon, Japan. This does not outrule the use of other plastics, for instance based on styrenes, methacrylates and/or the like. Suitable polymers may be copolymers comprising different monomers, for instance with at least one of the monomers discussed above.

C. Plasma Variables and the Gas Plasma Reactor

The electric excitation field applied typically has a frequency in the radiowave or microwave region, i.e., kHz-MHz or GHz respectively. The modification on the polymer surface caused by the plasma will depend mainly on a number of internal plasma parameters such as: type of species present in the plasma, spatial distributions, energy distributions and directional distributions. The species typically derives from one or more organic precursor compounds. In turn these parameters depend in a complex way on the external plasma parameters: reactor geometry, type of excitation, applied power, type of process gas, gas pressure and gas flow rate.

The results of a treatment may depend on the design of the reactor vessel used meaning that the optimal interval to a certain degree may vary from one reactor design to another. The results may also depend on where in the reactor the surface is placed during the treatment.

A suitable reactor vessel should enable electric excitation power input for instance in the microwave or radio wave ranges. The required intensity of the plasma may depend on the variables discussed above. Satisfactory gas plasmas may be found in the case the electric excitation power applied is $\leq 300$ W, with preference for $\leq 100$ W. The pressures are typically $\leq 200$ mTorr, with preference for $\leq 100$ mTorr. The design of the reactor vessel enables introduction of the vapor phase of the organic precursor into the reactor chamber. This includes the option of heating of the reactor chamber and/or flask containing the organic precursor. The reactor vessel is designed to facilitate homogenous plasma distribution in the reactor chamber. More details on parameters influencing plasma polymerization can be found in Inagaki, N., "Plasma surface modification and plasma polymerization." Technomic Publishing company, Inc., USA, 1996.

The proper combination of different plasma and apparatus parameters is typically found by varying the values for one or more of these parameters and study how this affect the properties of the modified substrate surface, i.e., the resulting hydrophilicity, hydrophobicity, anti-fouling, stability, etc.

D. The Chemical Structure of the Coat

The chemical structure of the coat such as degree and type of cross-linking, swelling, kinds of functional groups exposed to a surrounding liquid, etc. determines the chemical surface characteristics, primarily wetting/non-wetting ability including hydrophilicity and hydrophobicity, and non-specific adsorption of various compounds such as proteins and/or other biopolymers and bioorganic compounds.

Surface characterisation of the coat can be carried out by a number of methods, such as X-ray photoelectron microscopy (XPS), static secondary ion mass spectrometry (static SIMS), liquid contact angle methods, atomic force microscopy (AFM), near edge X-ray adsorption fine structure (NEXAFS), FTIR and chemical derivatization. For a review see Johnston et al. (J. Electron Spectroscopy and Related Phenomena 81 (1996) 303–317).

Preferably, a sufficiently hydrophilic coat exposes neutral hydrophilic groups to a liquid in contact with the coat, in particular lower alkyl ether, such as ethylene oxy, hydroxy groups, etc., and is essentially free of aromatic structures. The coat is essentially free of charged or chargeable groups, in particular if a low non-specific adsorption is required. Chargeable groups are karboxy (—COOH), amino (—NH$_2$), etc.). Non-chargeable groups are hydroxy bound to sp$^3$-hybridized carbon, ether, amido, etc.

There is a relatively large number of publications related to chemical structure of polymeric films deposited from gas plasmas that are based on organic precursor compounds (e.g., U.S. Pat. No. 5,153,072 (Ratner et al.) and U.S. Pat. No. 5,002,794 (Ratner et al.). A general idea has been that the incorporation of groups and/or properties that derive from a precursor compound can be related to the rate of fragmentation in the plasma and the rate of deposition of the coat on a substrate surface. It has been discussed that a lower power may decrease fragmentation and increase the incorporation of groups and properties that derive from the precursor compound. It has also been discussed that fragmentation of the precursor compound depends on W/FM where W is the RF power applied, and F and M are the flow rate and the molecular weight, respectively, of the organic precursor compound. Other variables that have been studied are: (a) the effect of pulsed radiofrequency (RF) discharges on fragmentation of the precursor compound in relation to an increase of the presence of precursor structures in the deposited coat, (b) the location of the substrate in the gas plasma reactor with the idea that a location adjacent but not submersed in the plasma will increase the degree of precursor structures in the coat, etc. An increase in precursor structures in a deposited coat has also been suggested if there is a negative temperature gradient between the plasma and the substrate to be surface modified. See Ohkubo et al. (J. Appl. Polym. Sci 41 (1990) 349-), López et al. (Langmuir 7 (1991) 766-, D'Agostino et al. (J. Polym. Sci. Part A: Polym. Chem. Edn. 28 (1990) 3378-, Cho et al. (J. Appl. Polym. Sci. 41 (1990) 1373-, Ward et al. (Short, Surfasce Interface Anal. 22 (1994) 477-, Kiaei et al. (J. Biomater. Sci.: Polym. Edn. 4 (1992) 35-, and Panchalingam et al. (ASAJO J. (1993) M305).

The organic precursor compound typically is polymerizable by which is meant that the compound is capable of forming a high molecular weight insoluble aggregate on the surface of the substrate. This may involve traditional polymerization reactions or take place by degradation, rearrangement and extensive reactions of the precursor compound and/or of the intermediary species formed in the gas plasma.

In order for an organic precursor, compound to function in the present invention it must have a sufficiently high vapor pressure at the selected temperature within the plasma reactor. This also means that precursor compounds that have a low tendency for hydrogen bonding may have advantages compared to precursor compounds of the same size that have a strong tendency for hydrogen bonding.

Small precursor compounds may also have advantages, e.g., with molecular weights $\leq$2000 dalton, such as $\leq$1000 dalton or $\leq$500 dalton. The advantage of small compounds and compounds with weak or no tendency for hydrogen bonding is based on the fact that hydrogen-bonding and increased molecular weight tends to increase the boiling point and the vapor pressure.

For hydrophilic coats, suitable precursor compound can be found amongst organic compounds that have a high content of heteroatoms selected amongst oxygen, nitrogen and sulphur, provided that the other plasma parameters are properly set. By the term "high content" in this context is meant that the ratio between the total number of the heteroatoms, e.g. oxygen, and the number of carbon atoms should be $\geq$0.1, such as $\geq$0.25 or $\geq$0.5 or $\geq$0.75, in the precursor compound. From theoretical considerations, this ratio is never larger than 2. In the case that the organic precursor compound has certain properties that one would like to incorporate into a coat, but a low content of heteroatoms, this may be compensated for by including oxygen in the gas plasma. Alternatively, one may include one or more other organic compounds for which the content of heteroatoms is higher than in the desired precursor compound. Typically, compounds for creating hydrophobic coats are hydrocarbons and fluorinated hydrocarbons (e.g., perfluoinated hydrocarbons (PFH))

For hydrophobic coats, suitable precursor compounds can be found amongst organic compounds having a low content of heteroatoms selected amongst oxygen, nitrogen and sulphur, provided that the other plasma variables are properly set. A "low content" in this context means that the ratio between the number of heteroatoms, e.g., oxygen, and the number of carbon atom should be $\leq$0.75, such as $\leq$0.50 or $\leq$0.25 or $\leq$0.10. In the case organic precursor compound has certain properties that one would like to incorporate into a coat, but a high content of heteroatoms, this might be compensated for by including one or more organic compounds for which the content of heteroatoms is lower than in the desired precursor compound.

Suitable precursor compounds may also be found amongst organic compounds that contain one, two or more structural units that are present in polymers that are known to give coats that are resistant to non-specific adsorption. These kinds of precursor compounds are in the innovative method combined with gas plasma conditions enabling this property to be retained in the coat deposited on the substrate.

There are a large number of polymers that are known to reduce non-specific adsorption. Typically, they are non-ionic and hydrophilic, i.e., contains a plurality of neutral hydrophilic groups, such as hydroxy, amido, and lower alkoxy including alkyleneoxy ($C_{1-3}$ in particular $C_2$) and alkyl ether groups. See for instance U.S. Pat. No. 6,337,212 (Caliper), WO 0147637 (Gyros AB), U.S. Pat. No. 4,680,201 (Hjertén), U.S. Pat. No. 5,840,388 (Karger et al.), U.S. Pat. No. 5,240,994 (Brink et al.), and U.S Pat No. 5,250,613 (Bergström et al.), which are incorporated herein by reference. Precursor compounds to be used in this variant of the invention can, thus, be found amongst low molecular weight compounds that comprise one or more of these structural units that are present in polymers that reduce non-specific adsorption. At the priority date, one of the most promising precursor compounds comprise the structural unit —(CH$_2$)$_n$ O—, where (a) n is an integer 1–3, with preference for 2, (b) the free valence at the carbon binds to hydrogen or an oxygen, and (c) the free valence at the oxygen binds to a hydrogen or a carbon. The carbon may be sp$^{3-}$, sp$^{2-}$ or sp-hydridized and may thus be part of a saturated or unstarurated hydrocarbon group such as alkyl (for instance $C_1$, $C_2$, $C_3$ to $C_5$) and alkenyl, such as vinyl). This is in-line with the findings of Ratner et al. (U.S. Pat. No. 5,002,794 and U.S. Pat. No. 5,153,072) and Timmons et al. (U.S. Pat. No. 6,329,024, U.S. Pat. No. 5,876,753, and EP 896035), which are incorporated by reference for precursor compounds comprising 1–4 repetitive ethylene oxide units either in straight form or in cyclic form (crown ethers). According to the same principles, one can envisage that other suitable candidate precursor compounds can be found amongst low molecular weight compounds which comprise structural units selected amongst —CH$_2$OH, —CH$_2$ (OCH$_3$), and [—CH$_2$—CH (OH)]$_n{'}$—, and [—CH$_2$—CH(OR) ]$_n{'}$—and corresponding monomers wherever applicable, where (a) n' is an integer 1–10 with preference for 1–5, (b) R is lower alkyl ($C_{1-5}$), such as methyl, or lower acyl ($C_{1-5}$, such as formyl or acetyl), and (c) the free valences binds to atoms selected amongst hydrogen, carbon, sulphur, nitrogen and oxygen. None of sulphur, nitrogen and oxygen binds a hydrogen when two or more of them binds to the same carbon. Other candidate precursor compounds are monomers or oligomers (2–10, such as 2–5, repeating monomeric units) corresponding to polymers that give coats that have low non-specific adsorption.

In preferred variants, a coat providing low non-specific adsorption can also have a sufficient hydrophilicity in order to secure a reliable and reproducible transport of reagents by an aqueous liquid flow. One can, thus, envisage that candidates of precursor compounds can also be found among the precursor compounds that are candidates for the creation of hydrophilic coats. See above.

The thickness of the coat can be <50%, for instance ≦20% or ≦10%, of the smallest distance between two opposing sides of a microchannel part comprising the innovative coat. An optimal thickness is typically be ≦1000 nm, for instance ≦100 nm or ≦50 nm, with the provision that the coat shall permit a desired flow to pass through. A lower limit is typically 0.1 nm. The figures of present invention refer to thickness after saturation with the liquid intended to pass through a microchannel part comprising the coat. The coat may or may not swell in contact with the liquid, which is passing through a microchannel structure.

It is important to control the selected process parameters so that they lead to predetermined surface characteristics, for instance preselected wetting/or non-wetting properties and/or ability to reduce non-specific adsorption (anti-fouling). This can be accomplished as outlined in the experimental part that describes the determination of a) liquid contact angles, and b) adsorption of albumin, which is a measure of non-specific adsorption. Once the proper values/ranges of the process parameters have been found for the predetermined surface characteristics, the process can be run without testing.

For aqueous solutions the term "a reduction in non-specific adsorption" (anti-fouling effect) refers to bovine serum albumin as a reference/model substance and means that the ratio between adsorption of bovine serum albumin after and before a gas plasma treatment of a surface according to the invention is ≦0.75, such as ≦0.50 or ≦0.25 (decrease ratio). The ratio can be even lower, for instance ≦0.10.

E. Adhering the Substrate Surfaces

There are a number of techniques suggested in the literature. Thus conventional bonding without use of a particular adhesive may be utilized, for example, in the case that the substrates are made of inorganic material such as silicon, glass, quartz and the like. In the case that the substrate surfaces comprise plastics, the two surfaces can be fixed to each other by pressing the surfaces together while heating selectively the surface not containing microstructures above its transition temperature, while the surface with the microstructures are maintained below its transition temperature. In other alternatives, various kinds of adhesives or glues may be used. See further WO 9424900 (Ove Öhman), WO 9845693 (Soane et al.), U.S. Pat. No. 6,176,962 (Soane et al.), WO 9956954 (Quine), and WO 0154810 (Derand et al., Gyros AB), which are incorporated herein by reference. Thermolaminating is important because this technology has been shown to be capable minimizing destruction of differences in chemical surface characteristics that are to be retained in the microfluidic device obtained after step (iv). See WO 0154810 (Derand et al., Gyros AB).

Problems with so-called bond voids can be minimized if the open microchannel structures in a substrate surface is defined by walls arising from the surface. See WO 9832535 (Lindberg et al.) and WO 0197974 (Chazan et al., Caliper).

In order to avoid that an adhesive is pressed into a microchannel during steps (iv) and (v) the microchannel structures are preferably defined by relief patterns that are present in either one or both of the substrate surfaces as outlined in WO 03055790 (Dérand et al.), which is incorporated by reference.

In principle the adhesive may be selected as outlined in U.S. Pat. No. 6,176,962 and WO 9845693 (Soane et al.), which are incorporated by reference. Thus, suitable bonding materials include elastomeric adhesive materials and curable bonding materials. These kinds of bonding material as well as others may be in liquid form when applied to a substrate surface. Bonding materials including adhesives thus comprises liquid curable adhesive material and liquid elastomeric material. After application, the adhesive material is rendered more viscous or non-flowable for instance by solvent removal or partial curing before the other substrate is contacted with the adhesive. The term "liquid form" includes material of low viscosity and material of high viscosity. Curable adhesive includes polymerizable adhesives and activatable adhesives. Thermo-curarable, moisture-curable, and bi-, three- and multi-component adhesives are also examples of curable adhesives.

III. The Microfluidic Device

This aspect of the invention is primarily characterized in that a part of the inner surface of at least one of the microchannel structures has been modified by the use of gas plasma comprising an organic precursor compound selected according to the principles outlined for the first aspect, i.e. has one or more surface characteristics that is achievable by a plasma polymerization coating method. Additional characteristic features are defined below.

The microfluidic device preferably contains a plurality of microchannel structures, each of which is defined between two or more planar substrates. Each microchannel structure may comprise one, two, three or more functional parts selected among: a) application chamber/cavity/area, b) conduit for liquid transport, c) reaction chamber/cavity; d) volume defining unit; e) mixing chamber/cavity; f) chamber for separating components in the sample, for instance by capillary electrophoresis, chromatography and the like; g) detection chamber/cavity; h) waste conduit/chamber/cavity; i) internal valve; j) valve to ambient atmosphere; etc. Many of these parts may have one or more functionalities. There may also be collecting chambers/cavities in which a compound, which has been separated, formed or otherwise processed in a microchannel structure are collected and transferred to some other instrument, for instance an analytical instrument such as a mass spectrometer. In addition, there are also one or more outlet vents for air. Inlets and outlets for liquids may also function as vents (inlet vent or outlet vent).

The preferred devices are typically disc-shaped with sizes/surface areas and/or forms similar to the conventional CD-format, e.g., their surface areas are in the interval from 10% up to 300% of the surface area of a CD of the conventional CD-radii. The upper and/or lower sides of the disc may or may not be planar.

The preferred microfluidic discs have an axis of symmetry (Cn) that is perpendicular to the disc plane, where n is an integer $\geq 2$, 3, 4 or 5, preferably $\infty$ (C$\infty$). In other words the disc may be rectangular, such as square-shaped, or have other polygonal forms, but is preferably circular. Once the proper disc format has been selected centrifugal force may be used for driving liquid flow. Spinning the device around a spin axis that typically is perpendicular or parallel to the disc plane may create the necessary centrifugal force. In the most obvious variants at the priority date, the spin axis coincides with the above-mentioned axis of symmetry.

Different principles may be utilized for transporting the liquid aliquots within the microfluidic device/microchannel structures between two or more of the functional parts described above. Inertia force may be used, for instance by spinning the disc as discussed in the preceding paragraphs. Other forces that may be used are electrokinetic forces and non-electrokinetic forces, such as capillary forces, hydrostatic pressure, etc. In preferred variants utilizing centrifugal force for liquid transport, each microchannel structure comprises an upstream section that is at a shorter radial distance than a downstream section relative to a spin axis.

The microfluidic device may also comprise common channels connecting different microchannel structures, for instance common distribution channels for introduction of liquids and common waste channels including waste reservoirs. Common channels including their various parts such as inlet ports, outlet ports, vents, etc., are considered to be part of each of the microchannel structures they are connecting. Common microchannels may also fluidly connect groups of microchannel structures that are in different planes or in the same plane.

IV. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Plasma Treatment with Diethylene Glycol Dimethyl Ether

A polycarbonate CD disc (Macrolon DP-1265, Bayer AG, Germany), and pieces cut from a polycarbonate CD disc were placed in a plasma reactor (CVD Piccolo, Plasma Electronic, Germany), and subjected to argon plasma treatment at 24 W for 2 min. Subsequently, the polycarbonate surfaces were treated with plasma of diethylene glycol dimethyl ether (diglyme; Aldrich, USA) at 24 W for 5 min. The water contact angle (sessile drop) of the resulting surfaces was measured on a Ramé-Hart manual goniometer bench. The average of six equilibrium measurements (three droplets) was 48°.

Example 2

Plasma Treatment with Diethylene Glycol Dimethyl Ether and Allylic Alchohol

A polycarbonate CD disc (Macrolon DP-1265, Bayer AG, Germany), and pieces cut from a polycarbonate CD disc were placed in a plasma reactor (CVD Piccolo, Plasma Electronic, Germany), and subjected to argon plasma treatment at 24 w for 2 min. Subsequently, the polycarbonate surfaces were treated with plasma of diethylene glycol dimethyl ether (diglyme; Aldrich, USA) at 24 W for 5 min. Finally, they were subjected to plasma of allylic alcohol (Merck, Germany) at 12 W for 5 min. The water contact angle (sessile drop) of the resulting surfaces was measured on a Ramé-Hart manual goniometer bench. The average of six equilibrium measurements (three droplets) was <10°.

Example 3

Plasma Treatment with Ethylene Glycol Vinyl Ether

A polycarbonate CD disc (Macrolon DP-1265, Bayer AG, Germany), and pieces cut from a polycarbonate CD disc were placed in a plasma reactor (CVD Piccolo, Plasma Electronic, Germany), and subjected to argon plasma treatment at 24 w for 2 min. Subsequently, the polycarbonate surfaces were treated with plasma of ethylene glycol vinyl ether (Aldrich, USA) at 12 W for 5 min.

The water contact angle (sessile drop) of the resulting surfaces was measured on a Ramé-Hart manual goniometer bench. The average of six equilibrium measurements (three droplets) was 22°.

Example 4

Microfluidic Test

A silicone rubber lid (polydimethylsiloxane) was placed on a polycarbonate CD with recessed microchannel pattern, (50–200 $\mu$m wide, 50–100 $\mu$m deep), that had been treated either with diglyme plasma, or with diglyme plasma with subsequent allylic alcohol plasma treatment, as described above. Alternatively, silicone rubber with recessed microchannel pattern (1000 $\mu$m wide, 100 $\mu$m deep) was placed on flat polycarbonate surfaces that had been treated either with diglyme plasma, or with diglyme plasma with subsequent allylic alcohol plasma treatment, as described above. Resulting flow channels were examined using a solution of Cibacron Brilliant Red (CIBA limited) in MilliQ water (Millipore). A drop was placed at the channel inlet and it was concluded that flow rate into channels on surfaces that had been subjected to diglyme plasma with subsequent allylic alcohol plasma treatment was significantly higher than on surfaces that had only been treated with diglyme plasma.

Example 5

Protein Adsorption Studied with Total Internal Reflection Fluorescence (TIRF) Spectroscopy The theory of TIRF spectroscopy, as well as the experimental set-up used in the present work is described in Example 1.

Bovine serum albumin (BSA; fraction V, Sigma, USA) was chosen as model protein for adsorption studies, and labelled with fluorescein-5-isothiocyanate (FITC; isomer I; Molecular Probes), as described in [Lassen, B. and Malmsten, M., Competitive protein adsorption studied with TIRF and ellipsometry. Journal of colloid and interface science, 1996. 179: p. 470–477]. The molar ratio of FITC to proteins was found to be approximately unity in all cases.

Figure 1:
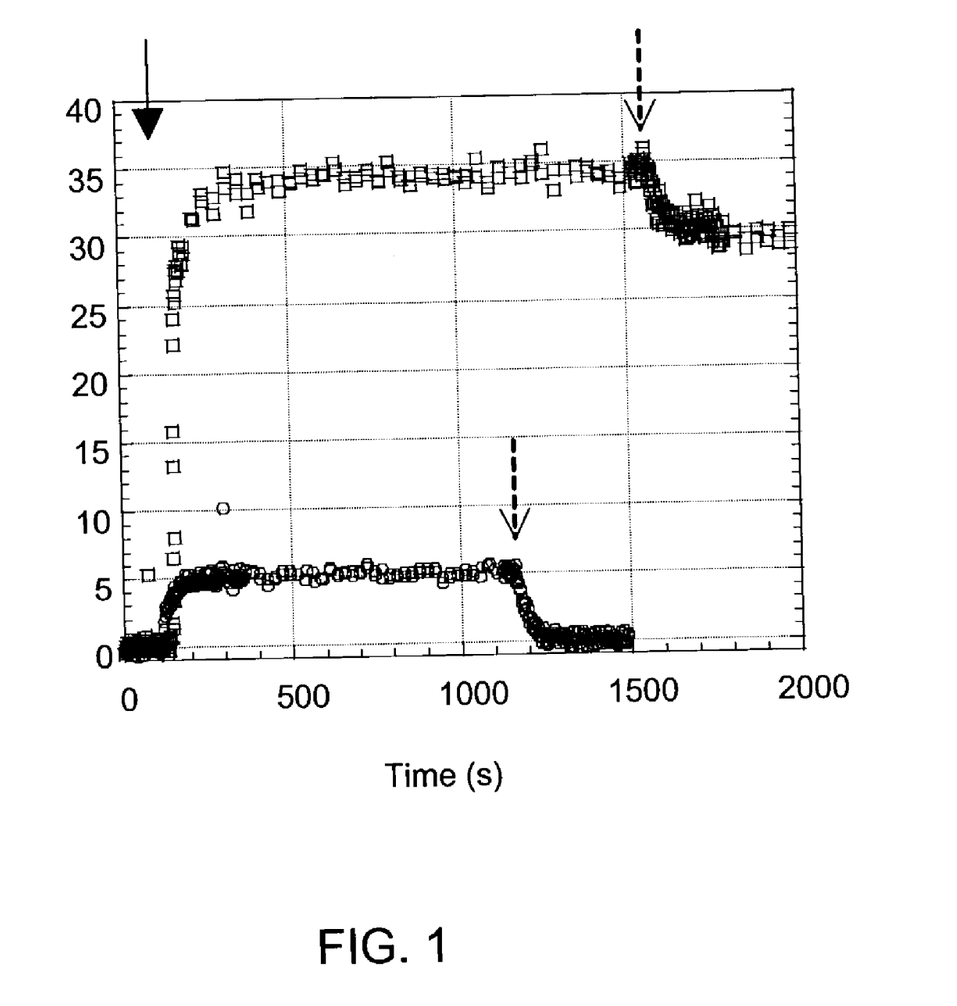
FIG. 1 shows Total Internal Reflection Fluorescence (TIRF) with Fluorescence-5-isothiocyanate-bovine serum albumin (FITC-BSA) on untreated Polycarbonate (PC) (squares), and on PC treated with diglyme (24 W) in the plasma reactor (circles). Protein solution (400 ppm) enters the flow cell (filled arrow) and is replaced by PBS buffer (dashed arrow).

A TIRF fluorescence intensity graph resulting from adsorption of 400 ppm FITC-BSA on untreated polycarbonate (PC) is shown in FIG. 1, together with a graph representing the same experiment on a diglyme plasma-treated surface. TIRF fluorescence intensity graphs using diglyme plasma+allylic alcohol plasma (FIG. 2), and ethylene glycol vinyl ether plasma (FIG. 3) are also presented here.

Figure 2:
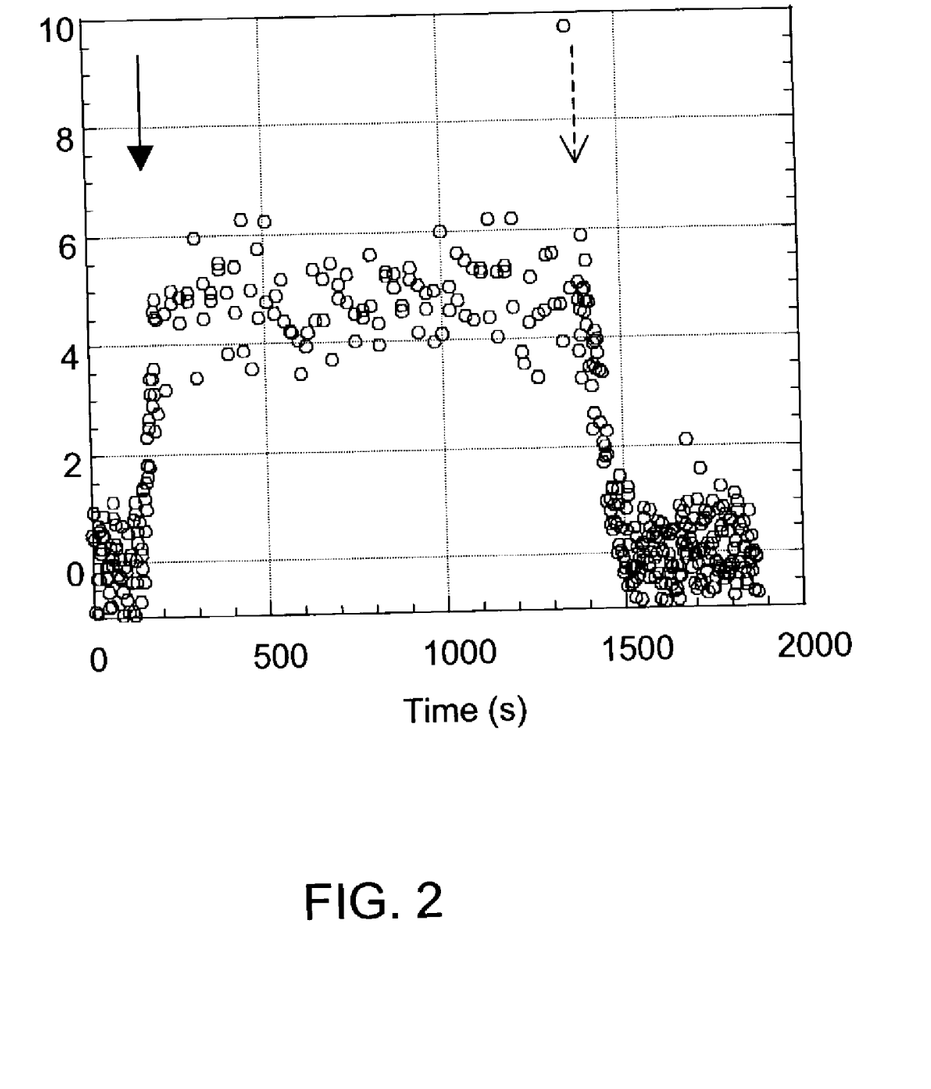
FIG. 2 shows TIRF with FITC-BSA on PC treated with diglyme (24 W), and allylic alcohol (12 W) in the plasma reactor. Protein solution (400 ppm) enters the flow cell (filled arrow) and is replaced by PBS buffer (dashed arrow).
Figure 3:
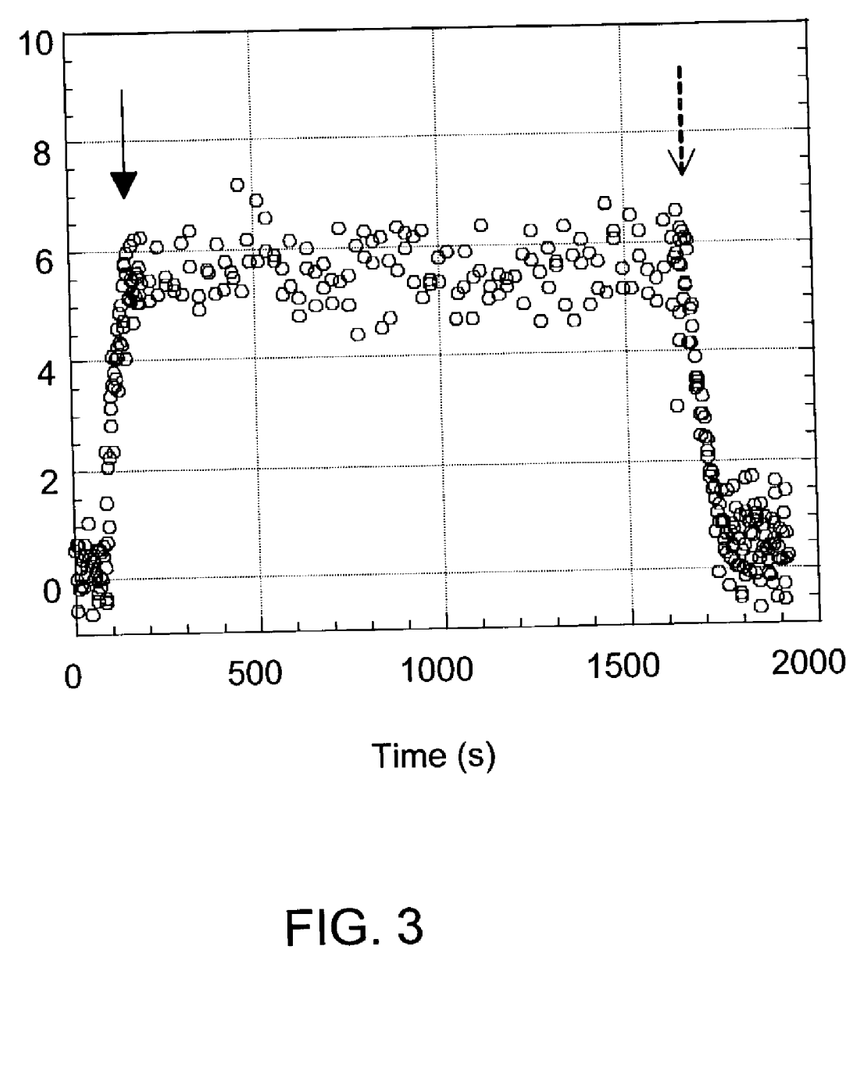
FIG. 3 shows TIRF with FITC-BSA on PC treated with ethylene glycol vinyl ether-plasma (24 W) in the Gyros reactor. Protein solution (400 ppm) enters the flow cell (filled arrow) and is replaced by PBS buffer (dashed arrow).

It is apparent from the figures that the ratio between adsorption of protein on the treated surface and the untreated surface always is <0.25.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for the manufacture of a microfluidic device comprising one or more enclosed microchannel structures, each of which comprises a section that is defined between two essentially planar substrates, wherein one surface in either one or both of the substrates comprises microstructures in the form of grooves or projections that match each other so that they together define said section for each of said one or more microchannel structures when the two surfaces are apposed in the microfluidic device, the method comprises the steps of:
   (i) providing the planar substrates,
   (ii) placing at least one substrate in a gas plasma reactor, and creating within said plasma reactor a gas plasma containing an organic precursor compound, said organic precursor compound and the conditions in the reactor are selected such that a wettable coat that is also anti-fouling is formed on a selected part of the surface of the substrate,
   iii) removing the substrate from the plasma reactor, and
   (iv) adhering the surfaces of the substrates to each other so that said section of each of said microchannel structures is formed between the two surfaces.

2. The method of claim 1, wherein said section is a complete microchannel structure.

3. The method of claim 1, wherein the precursor compound and the conditions in the reactor are selected to give the wettable coat in step (ii) a water contact angle $\leq 90°$.

4. The method of claim 3, wherein the water contact angle is $\leq 60°$.

5. The method of claim 1, wherein the precursor compound and the conditions are selected in step (ii) so that the wettable coat is introduced on selected parts of individual microchannel structures, and that a second coat is introduced on other selected parts of the microchannel structures by an additional coating step introduced between steps (ii) and (iv).

6. The method of claim 5, wherein the second coat is non-wettable.

7. The method of claim 5, wherein the second coat is wettable.

8. The method of claim 1, wherein the coat introduced in step (ii) has been modified by an additional step between step (ii) and step (iii) also utilizing a gas plasma.

9. The method of claim 8, wherein the additional step strengthens the wettability of the coat without essentially destroying the anti-fouling property accomplished in step (ii).

* * * * *